May 26, 1942.  G. B. ROLOSON  2,284,478
LIGHTNING ARRESTER, PLUNGER TYPE
Filed March 6, 1940  3 Sheets-Sheet 1
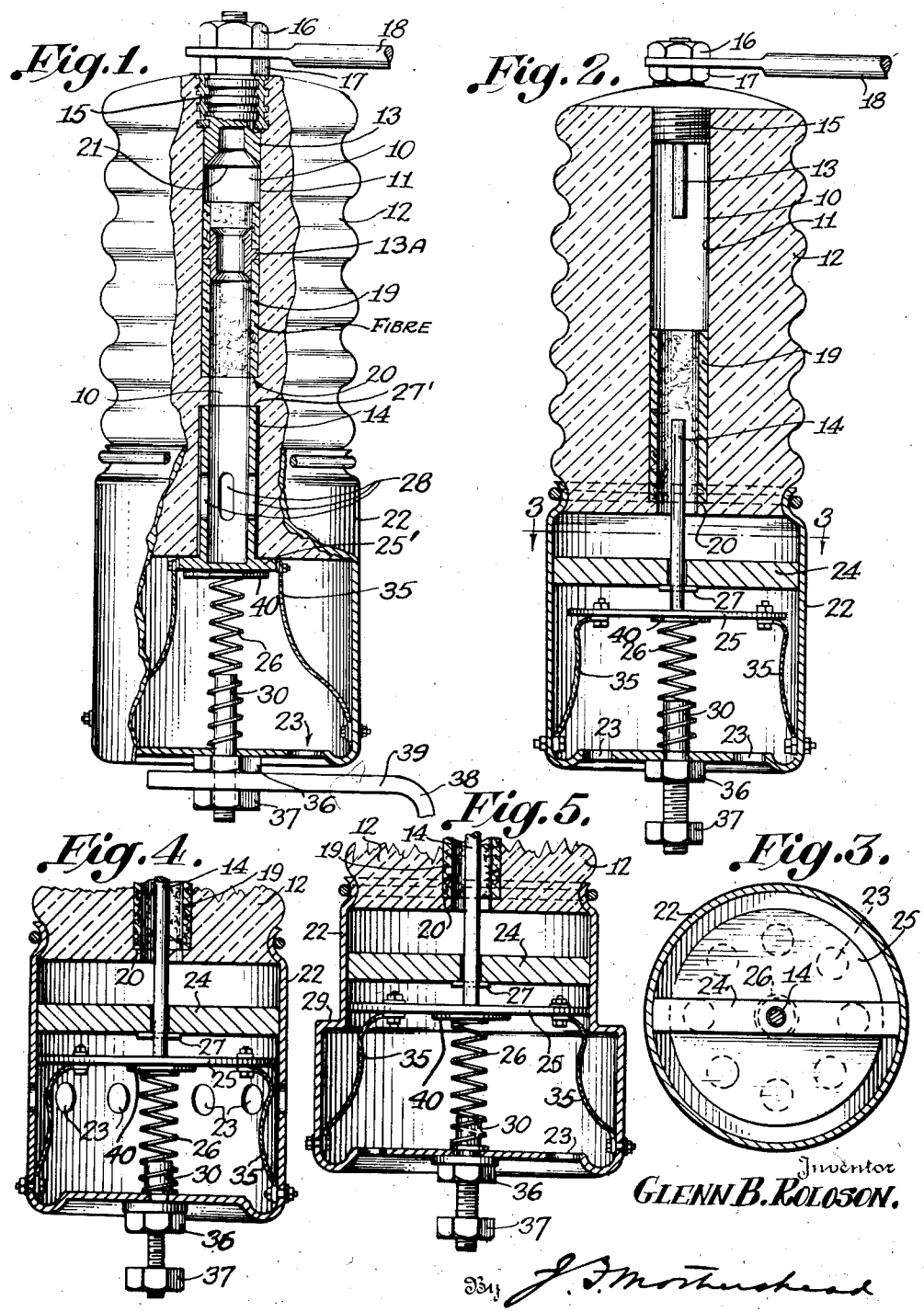
Inventor
GLENN B. ROLOSON.

May 26, 1942.  G. B. ROLOSON  2,284,478
LIGHTNING ARRESTER, PLUNGER TYPE
Filed March 6, 1940  3 Sheets-Sheet 2
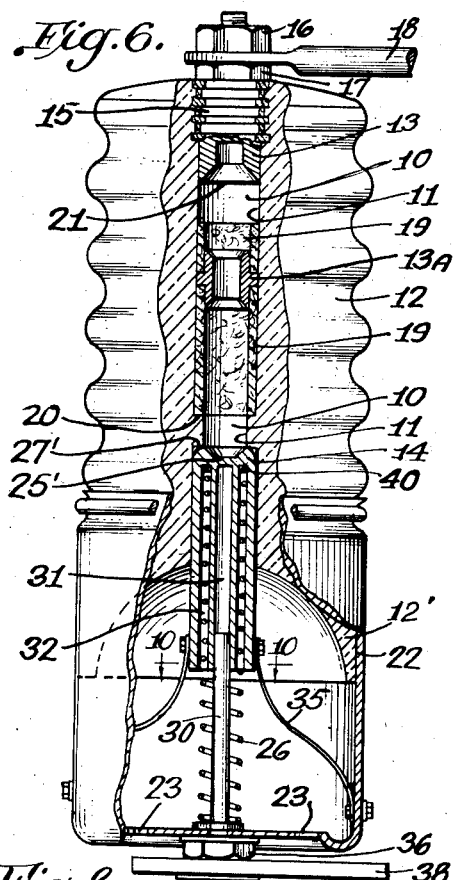
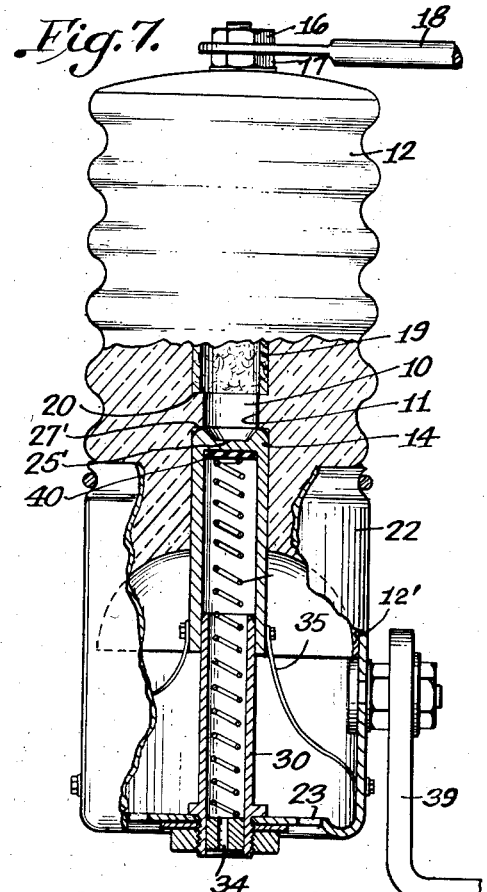
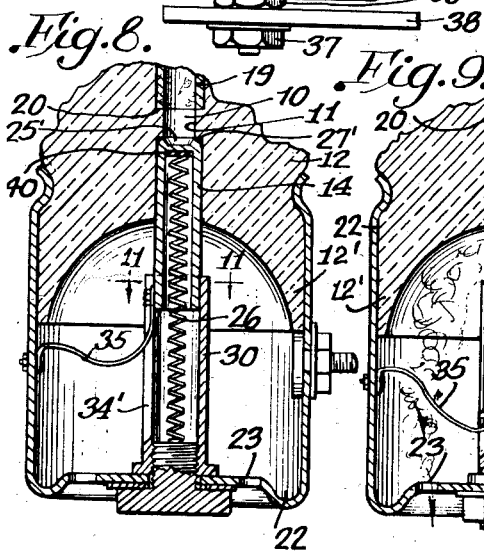
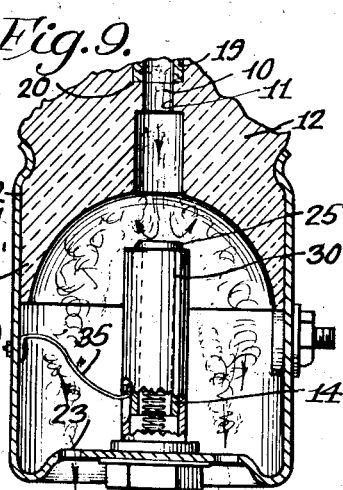
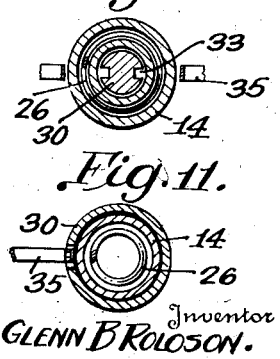
Inventor
GLENN B ROLOSON.
By J. S. Motherhead
Attorney May 26, 1942.  G. B. ROLOSON  2,284,478
LIGHTNING ARRESTER, PLUNGER TYPE
Filed March 6, 1940  3 Sheets-Sheet 3
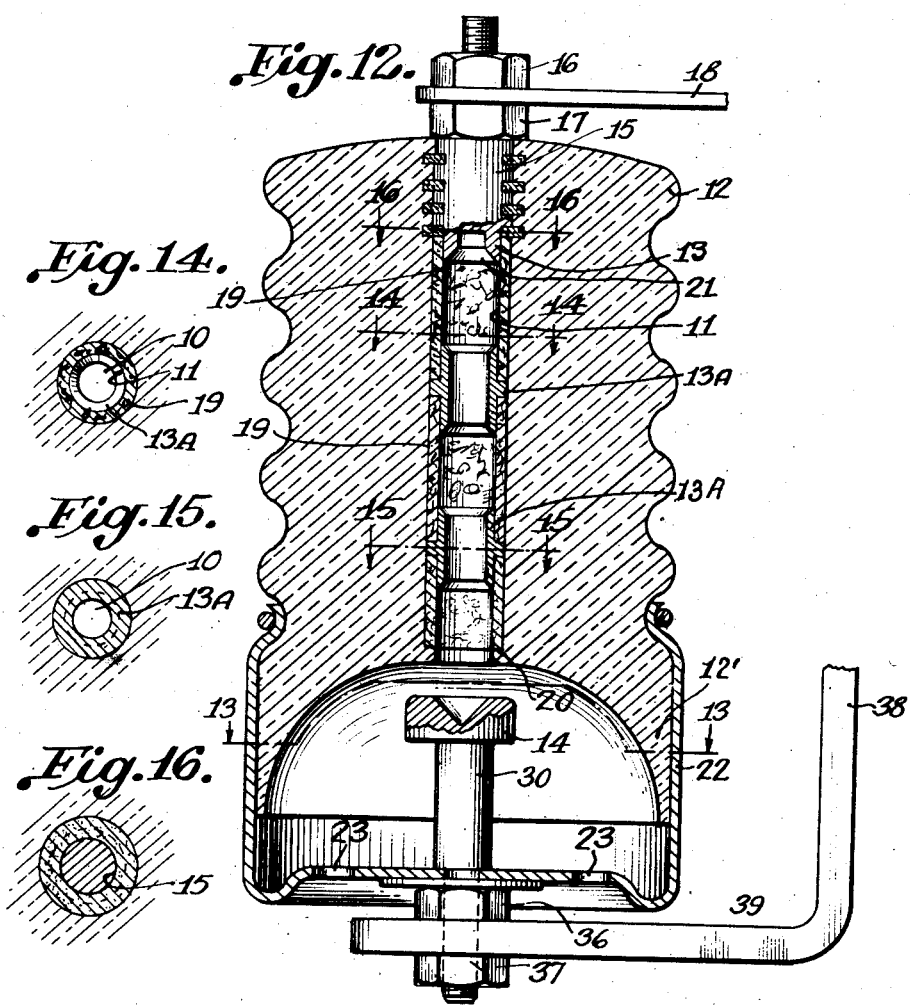
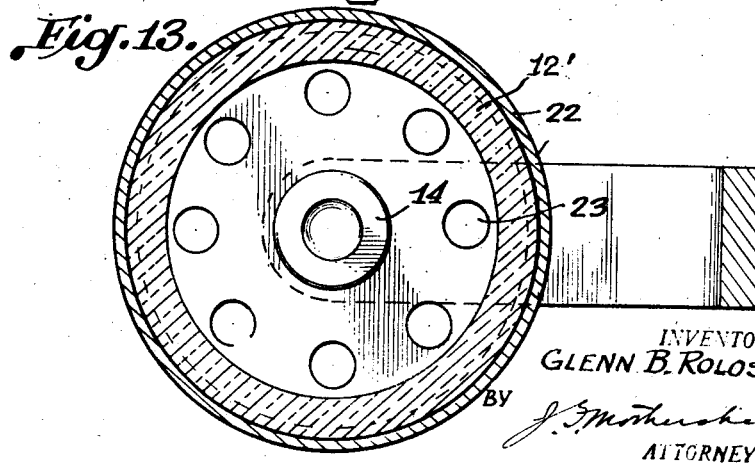
INVENTOR.
GLENN B. ROLOSON.
BY
ATTORNEYS.

Patented May 26, 1942

2,284,478

UNITED STATES PATENT OFFICE 2,284,478

LIGHTNING ARRESTER, PLUNGER TYPE

Glenn B. Roloson, Crestone, Colo.

Application March 6, 1940, Serial No. 322,531

18 Claims. (Cl. 175—30)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

My invention pertains to lightning arresters of the plunger type for the prevention of interruptions to service and damage to connected apparatus due to surges of current produced by lightning or other causes. More specifically my improvements comprise a voltage limiting and current surge discharge device with follow-up current (arc) interrupting means.

While my invention is adapted for use between any conductors in which a difference of potential exists, it will be described as used between line and ground conductors in order that non-confusing references may be made to the two primary electrodes which will be referred to as line and ground electrodes for distinction.

One of the earliest and simplest forms of protective devices for relieving electric transmission and distribution lines from excess voltage, produced by lightning or other causes, was to bring an electrode connected to the line, in close proximity in open air to an electrode connected with the ground. These electrodes were spaced at such a distance apart that the normal line voltage was not sufficient to start a current to flow between the electrodes. However, the electrodes were close enough to each other that when an abnormal voltage appeared between the line and ground the current would discharge between the electrodes, thus reducing the excess voltages between the line and ground.

One of the difficulties of the above described unconfined air-gap was that when an arc once formed between the electrodes, the normal line voltage was sufficient to maintain an arc across the electrodes, thus leaving a virtual ground on the line after the device had operated. This current flow across the electrodes, created by an excess voltage surge but maintained by normal line voltage, is referred to as the "follow-up" current. Various methods have been utilized to interrupt the follow-up current, perhaps the most successful being patterned after a common type of expulsion fuse which has been in use for a considerable period of time. The arc between the electrodes in this fuse was confined within a fibre tube which was open at one end. When the arc came in contact with the fibre it produced a non-ionized gas in which it was difficult to maintain an arc. The sudden rush of the gas extinguished the arc.

Many lightning arresters have been made which make use of the principle of the above described expulsion tube. One of the chief difficulties of this type of arrester has been due to the electrodes being a fixed distance apart. If the electrodes are set close enough together to provide adequate protection to apparatus connected to the electric line and also to prevent line flashover, the electrodes will be too close together to interrupt the follow-up current, especially if the follow-up current is small. On the other hand, if the electrodes are spaced far enough apart to insure the interruption of the follow-up current, they will be too far apart to provide adequate protection to apparatus connected to the electric line or to prevent flashover of the line.

It is an object of my invention to provide an arrester of the character having a much shorter air gap between the line and ground electrodes in normal position than would otherwise be practical. By this arrangement greater protection against voltage surges is afforded apparatus connected to the line in that the arrester is brought into operation by relatively small increases in line voltage whereby the voltage rise across apparatus is limited to small and undamaging values.

Another object of my invention is the provision of mechanical means for increasing the length of the air gap between electrodes immediately upon the setting up of an arc thereacross, whereby the arrester is enabled to interrupt large as well as small follow-up currents.

Aside from the object of non-ionizing the air gap between the electrodes to interrupt an arc, and of utilizing non-ionizing gas to lengthen an arc between the electrodes, it is also an object of my invention to force non-ionized gas directly against the arc stream to thereby reduce the number of ions in the arc stream to such an extent that there are no longer sufficient ions remaining to maintain the arc.

With the foregoing and other objects in view, my invention resides in the combination of parts and in the details of construction hereinafter set forth in the following specification and appended claims, certain embodiments thereof having the characteristics of my invention and by which the same may be practiced being illustrated in the accompanying drawings in which—

Fig. 1 is an upright view of an assembled arrester with a central section thereof cut away to show a portion or the interior arrangement of elements in cross section;

Fig. 2, a vertical cross-sectional view of an arrester incorporating the basic principles of the arrangement of Fig. 1, but of somewhat modified construction;

Fig. 3, a cross-section taken at line 3—3 of Fig. 2;

Fig. 4, a sectional view illustrating a modified construction of the plunger arrangement;

Fig. 5, a sectional view of another modified construction of the plunger arrangement;

Fig. 6, an upright view of an assembled arrester with a central section cut away to illustrate details of a modified form of electrode and plunger arrangement in cross-section;

Fig. 7, an arrester illustrating a further modification in structural details and arrangement;

Fig. 8, a sectionalized view of a still further modification within the scope of my basic improvements;

Fig. 9, an illustration of the operative position of the arrangement shown in Fig. 8;

Fig. 10, a section taken at 10—10 of Fig. 6;

Fig. 11, a section taken at 11—11 of Fig. 8;

Fig. 12, an upright cross sectional view of a still further modification of my improvements; and in which Figs. 13, 14, 15 and 16 are cross sectional views taken at lines 13—13, 14—14, 15—15 and 16—16, respectively of Fig. 12.

Broadly, my invention comprises spaced electrodes for limiting voltages between points of different potential, for discharging current surges and means operable by current flow between the electrodes to non-ionize the arc stream and lengthen the arc between the electrodes.

More specifically, with reference to the drawings, an air-gap 10 is provided within a passageway 11 of a housing 12, of insulating material having the characteristics of porcelain or glass, between the end of an electrode 13, which is referred to hereinafter as a line electrode and which closes one end of the passageway 11 and extends there-into, and the end of another electrode, which is referred to hereinafter as a ground electrode 14 which extends into the other end of the passageway. The line electrode 13 may be suitably carried in fixed position by a centrally bored stud 15, as shown in Fig. 2, in a manner to allow the electrode to project from the ends thereof into the passageway and outwardly thereof. A portion of the stud may also be extended and serve as the electrode 13 as in Figs. 1, 6 and 12. The stud of the Fig. 2 construction, or the stud-forming electrode of Figs. 1, 6 and 12, is threaded into the mouth of the passageway and the outer end of the electrode or stud is provided with clamping nuts 16 and 17 between which the line lead 18 may be secured. Suitable means for mounting the ground electrodes 14, and for connecting a ground lead thereto will be described hereinafter.

In the present arrangement, and as described and claimed in my copending application Ser. No. 295,778, a liner 19 is mounted within the passageway 11 of the insulator body 12. The liner 19 may be of any suitable gas-evolving material, of minimum conductivity, of the type conventionally used in the art of the class to which this invention pertains. This liner lines a portion of the walls of the bore or passageway 11 and provides a centrally disposed, unobstructed arc path therethrough. Although the device is ordinarily to be positioned in an upright manner, and although the line electrodes and their mounting means close the end of the passageway to the entrance of water, and though the liner is preferably of non-conductive material, the liner is spaced from the respective terminal electrodes to prevent its serving as a current conductor from one electrode to the other. In the alternative, if it is preferable to have the liner in contact with one or both of the terminal electrodes, the liner may be provided with a separation elsewhere to prevent a bridging-over from one electrode to the other. The liner may be retained in spaced position or in a predetermined position within the passageway 11 by any suitable means, one of which is shown in the drawings as comprising a shoulder 20 in the wall of the passageway 11, and upon which the tubular or cylindrical liner is brought to rest.

The electrodes 13 and 14 may suitably be of considerably less diameter than that of the passageway 11, as shown in Figs. 2 through 5, or of a diameter substantially that of the passageway 11 as shown in Figs. 1 and 6 through 11, as more specifically described hereinafter.

The electrodes of Figs. 2 through 5 are so arranged and constructed as to have their shortest arc path substantially along the axis of the passageway 11, whereas those of Figs. 1 and 6 through 11 are so constructed and mounted as to have their shortest arc paths between the perimeters of so much of the ends of the electrodes as are exposed in the passageway 11 immediately adjacent the walls thereof. For the accomplishment of the latter location of the arc, it will be noted that the inwardly extending end 21 of the electrodes 13 in Figs. 1, 6 and 12, and the innermost end of the electrodes 14 in Figs. 6, 7 and 8 are conically recessed or counter-sunk so that their greatest extension into the passageway 11 will lie perimetrically of and immediately adjacent the walls thereof. While the electrode 14 of Fig. 1 is of a tubular type, it will be noted that its open end is innermost in the passageway, and that the shortest path between it and the line electrode 13 is also immediately adjacent the walls of the passageway. It will thus be seen that by the arrangement and construction of Figs. 1 and 6 through 16, the electric discharge will occur between the perimeters of the line and ground electrodes, immediately adjacent the inner surface of the liner 19, where a flowing arc will have its greatest effect upon the liner to produce a non-ionized gas.

Though the electrodes and passageway are illustrated as circular in cross section, it is to be understood that they may be of any other desired, suitable or preferred shape in which event the recess or counter-sinking of the electrodes may not be conical but such as to provide a projecting rim on the end of those electrodes, perimetrically adjacent the walls of the passageway 11.

Ring electrodes 13A of the type shown in Figs. 1 and 6, and claimed in my aforesaid copending application, may also be employed intermediate the line and ground electrodes in order to create a series of shorter air gaps which are known to permit a flash-over sooner than over an air gap whose length is substantially the same as the sum of the series of shorter air gaps. The ring electrodes 13A have their ends flared outwardly toward the wall of the fiber liner in order that the shortest path between an intermediate electrode and either the ground or line electrode lies immediately adjacent the inner walls of the fiber liner where, as stated, an arc is most effective to evolve gas from the liner. It will also be noted that the ring electrode 13A is provided with a somewhat smaller passageway than through the fiber liner or through the passageway 11 which will cause the gases, in passing through the electrode, to flow along the axis of the passageway and thereby force the arc outwardly into the most effective range of the fiber liner.

The improvements by which the gap between the ground and line electrodes of the constructions of Figs. 1 through 11, is automatically lengthened as the result of an arc comprises means whereby the ground electrode is moved downwardly by the rush and the expansive forces of gas expelled from the gas-evolving liner by reason of the heat of an arc across the electrodes.

In the accompanying drawings means illustrative of practical arrangements for accomplishing the function of automatically lengthening the gap between the electrodes are shown in the embodiments of Figs. 1 through 11 as including a cylindrical or cup-like support 22, which is so formed for the support of operating elements, or for compressional, housing and shielding purposes. This support is suitably secured, such as in the manner shown, to the bottom of the insulator body 12, and is provided with one or more vents 23 in the bottom portion thereof for the eventual escape of gases evolved from the liner after their effects have been utilized to non-ionize the air-gap and their expansive forces utilized for lengthening the air-gap between electrodes. Further details of the gap lengthening means will first be considered in connection with Figs. 2 through 5, and thereafter with respect to the construction and arrangement shown in Figs. 1 and 6 through 11.

In the construction shown in Figs. 2 through 5 the cylindrical support 22 carries a suitable guide 24 for steering the rod-like electrode 14 longitudinally in its downward movement along the axis of the passageway, and upward to its normal predetermined position. Upon the lower portion of the electrode 14 and above the vents 23, a piston acting member 25 is secured in a horizontal manner transversely of the electrode and the cylindrical support.

The ground electrode is normally held in a predetermined spaced relation with respect to the line electrode by the upward force of a spring 26 and may be prevented from being pushed into closer relation or into contact with the line electrode by a suitable stop such as 27 cooperating with the guide 24 in the modifications of Figs. 2 through 5.

The piston member 25 of the embodiment illustrated in Figs. 2 and 3 is sufficiently less in diameter than the interior of the cylindrical support 22 as to allow the gases to escape around the edges thereof to the vents 23.

In the embodiment illustrated in Fig. 4, however, the piston member 25 is of sufficient diameter as to allow practically no gas to escape over the edges thereof. In this modification the vents 23 are provided in the side walls, rather than in the bottom, of the cylindrical support and in order for the gas to escape it is necessary for the piston member to be forced down below at least a portion of those vents. In this construction the first rush of gases has less free flow than in the construction of Figs. 2 and 3, but its action upon the piston member 25 is more positive because of the confinement of the gases until vented.

A similar result is obtained by the modified construction shown in Fig. 5, from an inspection of which it will be seen that the cylindrical support 22 is provided with an off-set portion 29 having a greater interior diameter than the upper portion in which the piston plate is normally held by the spring 26. In this construction, as in that of Fig. 4, the expansive force of the gas, produced by the action of the electric discharge on the fiber or gas producing material, is also utilized to move the piston downward. Here again the piston makes a fairly close fit with the inside of the upper portion of the cylindrical cup and when forced downward passes into the portion of the cylinder whose inside diameter is considerably greater than that of the piston, thus allowing the gas to escape around the edges thereof to vents 23.

With respect to the electrodes 14 of the modifications shown in Figs. 1 and 6 through 11, it will be noted that a shoulder 27' is provided in the walls of the passageway 11 against which the ends of the electrodes are normally held by the spring 26 and which shoulders serve as stop 27 of the constructions shown in Figs. 2 through 5. It will also be noted that the electrodes 14 of Figs. 1 and 6 through 11 make a fairly close fit within the passageway 11 and the side walls of the passageway serve as guides, similar to that of guide 24 of Figs. 2 through 5 during the downward movement and return of the electrode 14 in operation. It is to be further noted that one end of each of the electrodes 14 of Figs. 1 and 6 through 11 is closed by a closure member 25' which serves as a piston member similar to piston members 25 of Figs. 2 through 5.

The member 25' of Fig. 1 is on the outermost end of the inwardly opening tubular electrode 14 and may extend beyond the diameter of the passageway 11 to serve as an additional stop when forced up into an abutment with the base of the insulator body 12 by the spring 26. The electrode 14 of Fig. 1 is provided with one or more vents 28 through the side walls thereof for the escape of gases evolved from liner 19 when the expansive forces thereof are sufficiently great to lower the electrode far enough to expose at least a portion of the vents below the end of the passageway 11. The gas escaping through these vents then in turn flows through vents 23.

The constructions and arrangements shown in Figs. 6 through 11 differ somewhat from that of Fig. 1 in that the electrode 14 is closed at its upper end and must be forced out of the passageway 11, by the gases, before the gases can escape to vents 23.

If desired, suitable stops, such as studs 30 may be provided to limit the downward travel of the ground electrode 14 in the modifications of Figures 1 through 7. Such stops may vary in length or may be made adjustable, as shown, for predetermining the limit of travel of the ground electrode downwardly away from the line electrode. If desired, the stud 30 of the Fig. 1 construction may be continued at a reduced diameter, so as to extend a short distance through a close-fitting opening in the closure member 25' and act as an additional guide for the electrode during movement. The studs 30 of the modifications of Figs. 6 through 11 also serve as additional guides for the electrodes 14 of these constructions, as will be described more fully hereinafter.

In the Fig. 6 construction, the electrode 14, which is closed at the end extending innermost into the passageway 11, is provided with a central bore 31 extending into the base thereof and into which the stud 30 may slide and serve additionally as a guide for the electrode during its movement after it leaves the passageway 11. The electrode of this modification is also provided with a cylindrical recess 32 extending coaxially with the bore 31 into the base of the electrode 14 to accommodate the spring 26. A cross sectional view of this arrangement is shown in Fig. 10.

As in Fig. 6, the electrode 14 of the Fig. 7 construction houses the stud 30 and spring 26 in operation and the stud, in addition to serving as a stop to the downward movement of the electrode, serves as a guide for the electrode after it leaves the guidance of the walls of the passageway 11. The stud 30 in the Fig. 7 construction, however, is made hollow to accommodate the spring 26 therein. The electrode 14 in the constructions of Figs. 6 and 7 telescope the studs 30 in operation, and by doing so, greater protection is afforded the spring against the damaging effects of hot gases.

In Fig. 8 the arrangement is similar to that of Fig. 7, except that in this instance the stud 30 telescopes electrode 14 during operation instead of being housed by the electrode as in Fig. 7. Fig. 11 illustrates a cross sectional view of the Fig. 8 arrangement.

The spring 26 should be sufficiently resilient to be readily compressed by the expansive forces of the gases, evolved from the liner, against the piston members 25 and 25' in their rush from the passageway 11. In doing so, the electrode 14 is carried downward, thus lengthening the space between it and the line electrode.

In Figs. 6, 7 and 8 the end of the electrode 14 which extends innermost into the passageway 11 is forced by the gases outwardly from the end of the passageway 11 and, in such a position, as illustrated in Fig. 9, the gases are forced to pass at right angles through the arc flowing from the passageway 11 to the electrode 14. The arc is thus forced outward, lengthened and its path weakened by the non-ionized gas which is introduced directly into the arc stream. In such arrangements as those of Figs. 6 through 16 wherein the electrode 14 is fixed, or located in final operation, outwardly of the passageway 11, it is conceivably possible that the gases deflected into the arc stream may force the arc outwardly from its direct path between passageway 11 and electrode 14 sufficiently to cause it to sever its flow to electrode 14 and jump to the wall of the cup-like support 22, thereby lessening the purpose and effect of the deflected gases. To avoid such an occurrence the insulator body 12 is provided with a skirt-like continuation 12' which depends sufficiently to prevent the arc from forming between passageway 11 and the wall of the cup-like support 22.

In Figs. 6, 7 and 8, to avoid compressional opposition to the expansive forces of the gases upon the piston-acting members, vents are provided for the escape of air trapped within the hollow electrodes 14 by the studs 30 during the movement of the electrode. In Fig. 6 the vent comprises grooves 33 longitudinally in the sides of the stud 30, as shown in cross section in Fig. 10. A suitable vent in the Fig. 7 construction comprises an opening 34 in the bottom of the hollow stud 30, and in Fig. 8 the vent comprises an elongated slot 34' through the walls of the hollow stud 30.

A small vent, not shown, may be provided in the piston-acting members 25 and 25' to permit the slow escape gases which may be trapped above those members after the operation. Such vents will allow the spring 26 to restore the electrode to its normal position without being seriously opposed by a compressional force.

In order to insure good contact between the ground electrode and a ground lead, one or more flexible connections 35 may be provided by direct or indirect hook-up between the ground electrode and a ground connection, as shown in the drawings. In the Fig. 8 construction the elongated slot 34 may also be utilized as a passageway for the flexible lead 35 from the electrode 14 through the stud 30. The flexible leads 35 may extend from the electrodes 14 to the cup-like support 22, which support may serve as a conductor to a ground lead connection. The ground lead connecting means may suitably comprise a projecting continuance of stud 30 threaded or bolted to the base of the cylindrical support 22 to which the flexible leads 35 may be directly connected if desired. The projecting portion of the stud may in turn be provided with a pair of clamping nuts 36 and 37 between which a final ground lead 38 may be clamped. The initial portion of the ground lead may, if desired, be in the form of an arm or bracket 39 (see Figs. 1, 6 and 7) for mounting the device and the lead 38 extended therefrom. The ground lead or bracket may also be from a mounting on the side of the support 22 as shown in Fig. 7 if desired, rather than from a continuance of the stud 30.

Current flowing through the spring 26 may tend to weaken the same and in an effort to relieve the spring of such possible weakening effects an insulating disk 40 may be suitably interposed between the spring 26 and the ground electrode 14.

It is also within the scope of my invention to provide a device of the character described wherein a ground electrode 14, of the type having a perimetric rim projecting uppermost, is fixed a predetermined distance outwardly from the end of the passageway 11 in a position and of a construction such as shown in Figs. 12 through 16. In such a modification the electrode is not moveably responsive to the expansive forces of the gas; spring 26 of Figs. 1 through 11 is omitted; and the stud 30, somewhat modified, is utilized as electrode 14. If desired, the liner 19 may extend to or substantially to the lower end of the passageway 11 without bridging the electrodes 13 and 14, due to the space between the end of the passageway 11 and the outwardly positioned electrode 14. Such a modified arrangement would function in the manner described in connection with the final operation of the constructions of Figs. 6, 7 and 8 in that the gases flowing from the passageway 11 are deflected from their course between the base of the insulator body 12 and the electrode 14. An arc flowing non-axially of the passageway 11 between perimeters of the electrodes will be forced outwardly and lengthened by the gases which are deflected from their flow, axially from the passageway, directly across the arc stream. Furthermore, when the gases are deflected by this arrangement, as in that of Figs. 6, 7 and 8, from their flow along the axis of the passageway 11 directly across the non-axially flowing arc stream the number of ions in the arc stream are reduced to such an extent that there are no longer sufficient ions remaining for the arc to maintain itself.

While I have described my invention as a voltage limiting current surge discharge device, with follow-up current interrupting means to be interposed between line and ground wires of an electric power system, it is to be understood that the same may be interposed between any points, of differing electric potential in a system, to limit the voltage, to permit the discharge of surge current, and to interrupt the flow of follow-up current between such points in the system.

Having described my invention, what I claim is:

1. A voltage limiting, current surge discharge device with follow-up current interrupter comprising spaced electrodes for connection to conductors between which a difference of potential exists, means responsive to current flow between said electrodes to evolve gas, and means actuated by the force of the evolved gas to lengthen the space between said electrodes.

2. A voltage limiting, current surge discharge device with follow-up current interrupter comprising at least two electrodes having an air-gap therebetween, a chamber surrounding the air-gap, means within said chamber responsive to an arc between said electrodes to evolve a gas, and means actuated by the pressure of the evolved gas to lengthen said air-gap.

3. A voltage limiting, current surge discharge device with follow-up current interrupter comprising electrodes for connection to conductors between which a difference of potential exists, means providing a confined air-gap between the ends of said electrodes, means responsive to an arc across said electrodes to evolve gas within said confined air gap, and means responsive to the pressure of the evolved gas to move one electrode from the other, whereby to lengthen said air-gap.

4. In a voltage limiting, current surge discharge device with follow-up current interrupter having a fixed electrode and a movable electrode, means providing a confined air-gap between said electrodes, yieldable means normally holding said movable electrode in predetermined spaced relation with respect to said fixed electrode, the improvements comprising means operative by an arc across said electrodes to evolve gas in sufficient quantity as to oppose the normal tendency of said yieldable means and move said movable electrode from its normal predetermined spaced relation with respect to said fixed electrode to lengthen said air-gap.

5. A voltage limiting, current surge discharge device with follow-up current interrupter comprising electrodes, for connection to conductors between which a difference of potential exists, having a confined air-gap therebetween and means responsive to current flow between said electrodes to simultaneously non-ionize and lengthen said air-gap.

6. A voltage limiting, current surge discharge device with follow-up current interrupter comprising a pair of electrodes, means providing a confined air-gap between the ends of said electrodes, means responsive to an arc across said electrodes to produce non-ionizing means in said air-gap, and means operable by said non-ionizing means to lengthen said air-gap.

7. A voltage limiting, current surge discharge device with follow-up current interrupter comprising an insulating housing, a pair of spaced electrodes extending into communication with the interior of said housing, gas emitter material within said housing intermediate said electrodes, means connected to one of said electrodes and movable by the expansive forces of gases evolved from said emitter to increase the spacing of said electrodes.

8. A voltage limiting, current surge discharge device with follow-up current interrupter comprising an insulating housing, at least two electrodes within said housing in air-gap spaced relation with respect to each other whereby an arc may flow thereacross when abnormal voltages occur between said electrodes, gas emitter material, which when subjected to the heat of an arc, will emit gases, said material being mounted within said housing intermediate said electrodes, piston means connected to one of said electrodes and movably responsive, to lengthen said air-gap, by the expansive forces of gases evolved within said housing from said emitter material by an arc across said electrodes.

9. A voltage limiting, current surge discharge device with follow-up current interrupter, comprising an insulating body having a passageway therethrough, electrodes to which conductors of different potential are adapted to be attached respectively, said electrodes being mounted in communication with said passageway and normally in predetermined spaced relation with respect to each other, material which is gas-evolving when subjected to abnormal heat mounted in and lining a portion of the passageway between said electrodes, said lining incompletely bridging said electrodes and having an unobstructed passageway therethrough substantially in axial alignment with said electrodes, and means operable by the expansive forces of gases evolved from said liner to move at least one of said electrodes and lengthen the normal space between said electrodes.

10. A voltage limiting, current surge discharge device with follow-up current interrupter, comprising an insulating body having a passageway therethrough, electrodes to which conductors of different potential are adapted to be attached respectively, said electrodes being mounted in communication with said passageway and normally in predetermined spaced relation with respect to each other, material which is gas-evolving when subjected to abnormal heat mounted in and lining a portion of the passageway between said electrodes, said lining incompletely bridging said electrodes and having an unobstructed passageway therethrough substantially in axial alignment with said passageway, means operable by the expansive forces of gases evolved from said liner to move at least one of said electrodes and lengthen the normal space between said electrodes, and means for automatically restoring the displaced electrode to its normal predetermined relation to the other electrode upon the interruption of the cause whereby said gases were evolved.

11. A voltage limiting current surge discharge device with follow-up current interrupter, comprising an insulating body having a passageway therethrough, electrodes adapted to be connected respectively to points of differing electrical potential in an electric power system, said electrodes being mounted in alignment and communication with said passageway and normally in predetermined spaced relation with respect to each other, material which is gas-evolving when subjected to abnormal heat mounted within and lining only a portion of the length of the passageway between said electrodes, piston means fixed to one of said electrodes, means for holding said piston means and its connected electrode normally in predetermined spaced relation with respect to the other electrode, means for causing the expansive forces of gases evolved from said liner to react upon said piston means and move its connected electrode a greater distance from the other electrode than when in its normal relation with respect thereto.

12. A voltage limiting current surge discharge device with follow-up current interrupter, comprising a hollow insulating body, normally spaced electrodes adapted to be connected respectively to points of differing electrical potential, said electrodes being mounted so as to have their shortest line of separation within at least a portion of the hollow of said insulating body, material which is gas-evolving when subjected to abnormal heat mounted within and surrounding only a portion of the gap between said electrodes, piston means fixed to one of said electrodes, means for holding said piston means and its connected electrode normally in predetermined spaced relation with respect to the other electrode, means for causing the expansive forces of gases evolved from said liner to react upon said piston means and move its connected electrode a greater distance from the other electrode than when in its normal relation with respect thereto, means for limiting the distance of movement of said electrode and means for automatically returning said electrode to its normal relation with respect to the other electrode.

13. A voltage limiting current surge discharge device with follow-up current interrupter, comprising an insulating body having a chamber therein, a fixed electrode and a movable piston-acting electrode mounted in spaced relation within said chamber, material which is gas evolving when subjected to abnormal heat mounted within and completely lining a portion of said chamber between said electrodes, means for normally holding said movable electrode in predetermined spaced relation with respect to said fixed electrode, and means for causing the expansive forces of gases evolved from said liner to react upon said piston-acting electrode to lengthen the normal distance between said electrodes.

14. A voltage limiting, current surge discharge device with follow-up current interrupter, comprising an insulating casing, gas evolving material mounted within and lining a portion of the casing, a pair of electrodes extending into opposite ends of said casing with their innermost ends in predetermined spaced relation, said electrodes having their greatest extension into said casing immediately adjacent the walls of said casing, and means movably mounting one of said electrodes, said movable means being responsive to expansive forces of gases evolved from said liner.

15. A voltage limiting, current surge discharge device with follow-up current interrupter comprising an insulating casing, spaced electrodes supported by said casing, said electrodes having a peripheral rim substantially in alignment with the inner walls of said casing, a gas evolving material lining a portion of the casing between the rims of said electrodes, and means for deflecting gases actually exhausted and expelled outwardly from said casing, during operation of the device, through and beyond the shortest arc paths between the rim of one electrode and that of the other.

16. A voltage limiting, current surge discharge device with follow-up current interrupter, comprising an insulating body, gas evolving material mounted within and lining a portion of the body, electrodes extending into opposite ends of said body with their innermost ends in predetermined spaced relation, said electrodes having terminal rims in substantial alignment with the inner walls of said body, and means associated with one of said electrodes movable by the expansive forces of gases evolved from said lining to lengthen the separation between said electrodes.

17. A voltage limiting, current surge discharge device with follow-up current interrupter, comprising a through-bored insulating body, gas evolving material mounted within and lining a portion of the bore, electrodes extending into opposite ends of said bore with their innermost ends in predetermined spaced relation, said electrodes having annular foremost ends positioned immediately adjacent the walls of said bore, means associated with one of electrodes normally closing the base of said bore yet movable by the expansive forces of gases evolved from said liner to lengthen the separation between said electrodes, and resilient means for automatically restoring said movable electrode to its normal position upon the interruption of the cause whereby gases are emitted from said liner.

18. A voltage limiting, current surge discharge device with follow-up current interrupter, comprising a hollow insulating body, gas evolving material mounted within and lining a portion of the hollow of said body, spaced electrodes having terminal rims in substantial alignment with the inner walls of said body, and gas deflecting means for directing gases actually exhausted and expelled outwardly from said body, during operation of the device, through and beyond the arc paths between the terminal rims of said electrodes.

GLENN B. ROLOSON.